3,017,438
Patented Jan. 16, 1962

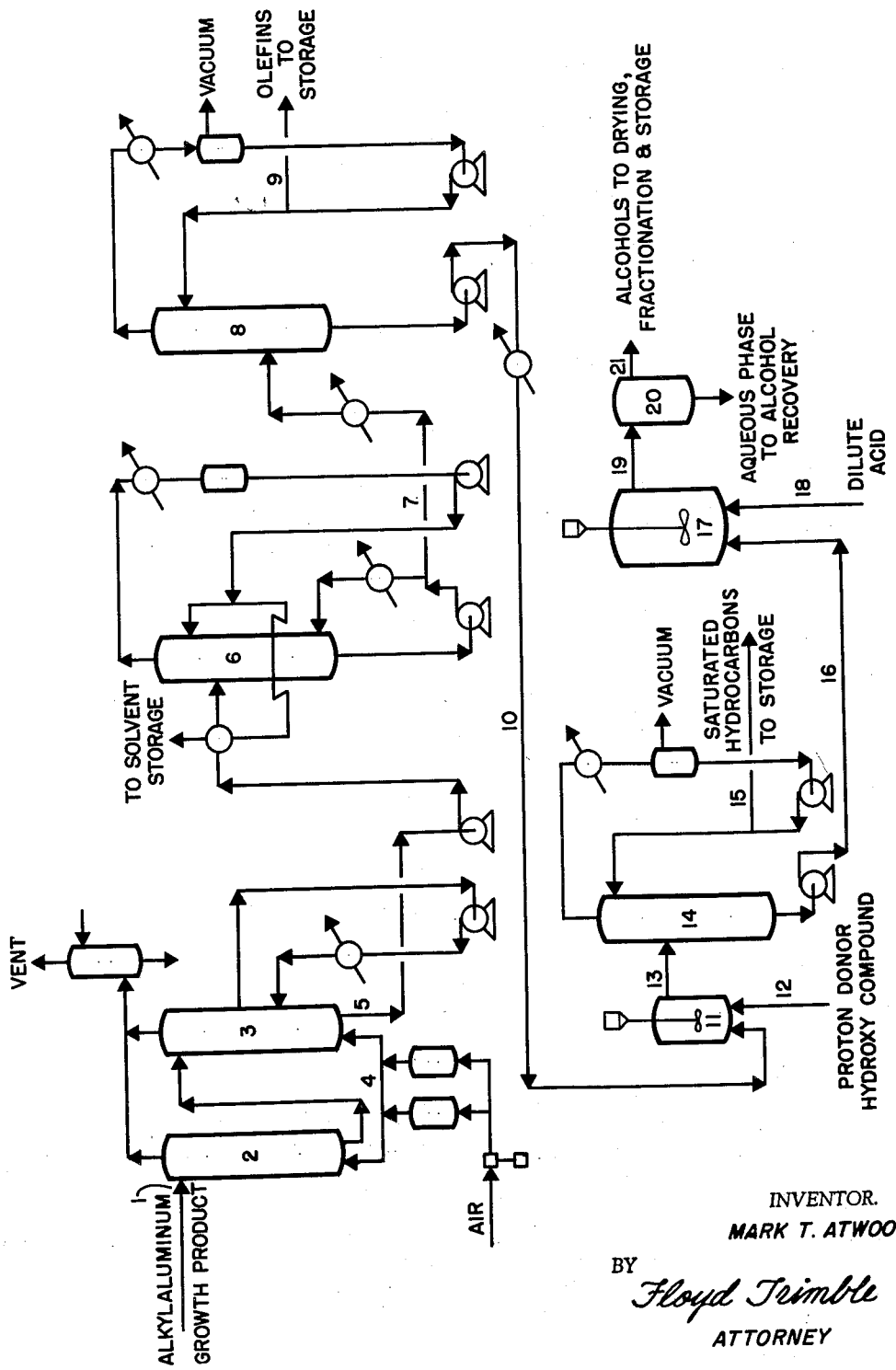

3,017,438
MANUFACTURE OF ALCOHOLS

Mark T. Atwood, Ponca City, Okla., assignor to Continental Oil Company, Ponca City, Okla., a corporation of Delaware
Filed May 4, 1959, Ser. No. 810,701
12 Claims. (Cl. 260—632)

This invention relates to the manufacture of alcohols from olefins by a method in which alkylaluminum compounds are formed, are subsequently oxidized, and are converted into alcohols. More particularly, this invention is concerned with an improved method of converting the alkylaluminum compounds to alcohols.

In the method of manufacturing alcohols which has been described in the literature by Dr. Karl Ziegler, the first step is the so-called growth reaction:

(1)   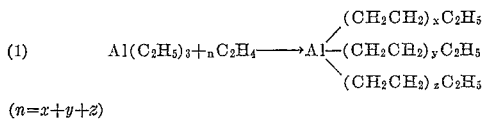

$(n=x+y+z)$

A by-product mixture usually results from this reaction, consisting of olefins formed, either by decomposition of the growth product or from a reaction which is either identical or similar to the Ziegler displacement reaction. The olefin by-products cannot be removed efficiently at this stage by distillation because higher olefins remain in the growth product and those containing about 12 to 16 carbon atoms have a boiling range which encompasses the boiling point of the triethylaluminum which is present, either as excess starting material or formed by dismutation of the growth product. It would be very desirable to recover the by-product olefins without excessive losses.

The growth product may be oxidized to aluminum alkoxides as the next step in alcohol synthesis:

(2)   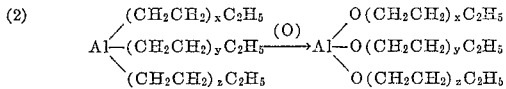

Higher olefin impurities in the growth product may be partially oxidized and carried over into the alkoxide product, resulting in the formation of traces of oxygen-containing organic impurities which appear in the final alcohol product.

The aluminum alkoxide product may then be hydrolyzed to give a mixture of alcohols which may also contain substantial quantities of the olefinic and oxygen-containing organic impurities mentioned above.

(3)   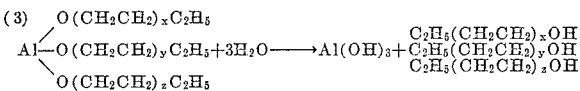

Unfortunately, the conversion of the alkylaluminum growth product to high molecular weight aluminum alkoxides by oxidation is often intentionally incomplete so as to avoid the danger of over-oxidation. This results in the presence of some alkylaluminum structures in the aluminum alkoxide oxidation product. When this impure mixture is hydrolyzed, there is produced a mixture of alcohols and saturated hydrocarbons.

It is the primary object of this invention to provide a method of conversion of alkylaluminum compounds to alcohols which obviates this presence of saturated hydrocarbons and yields substantially uncontaminated alcohol products. It is also an object of this invention to provide a procedure for converting alkylaluminum compounds to alcohols which makes possible the separate recovery of by-product olefins and by-product saturated hydrocarbons substantially free from any admixture with each other.

It is a further object of this invention to provide a process for accomplishing these ends which is simple in procedure and is economically feasible. Other objects and advantages will become apparent to those skilled in the art upon reading the description of the invention which follows.

Briefly, I have discovered that these and other objects may be accomplished by a process comprising the steps:

(a) Incomplete oxidation of a crude mixture of alkylaluminum compounds and olefins to a product mixture containing aluminum alkoxides and olefin by-products, (b) Distillation of the resulting product mixture under sub-atmospheric pressure to recover said olefin by-products, (c) Reaction of the unoxidized alkylaluminum structures in the impure aluminum alkoxide product with a compound having at least one hydroxyl group which acts as a proton donor to yield a mixture of saturated hydrocarbons and aluminum alkoxides, (d) Distillation of the resultant mixture under sub-atmospheric pressure to recover saturated hydrocarbons and a purified aluminum alkoxide product, and (e) Hydrolysis of the purified aluminum alkoxide product to yield alcohols which are substantially free from hydrocarbon contaminants.

In the event that separate recovery of pure olefins and saturated hydrocarbons is uneconomical because of the small quantities involved or for other reasons, the primary objectives of this invention may be accomplished by means of the following simplified procedure:

(a) Incomplete oxidation of a crude mixture of alkylaluminum compounds and olefins to an impure product mixture containing aluminum alkoxides and unoxidized alkylaluminum structures, (b) Reaction of unoxidized alkylaluminum structures in an impure aluminum alkoxide product with a sufficient quantity of compound having at least one hydroxyl group which acts as a proton donor, thereby obtaining a mixture containing aluminum alkoxides and hydrocarbon by-products, (c) Distillation of the resultant mixture under sub-atmospheric pressure to recover a purified aluminum alkoxide product, and (d) Hydrolysis of the purified aluminum alkoxide product to yield alcohols which are substantially free from hydrocarbon contaminants.

In order to disclose the nature of the present invention still more clearly, the following illustrative examples will be given, in which parts used are parts by weight.

Example 1

One hundred forty-nine parts of trioctylaluminum was mixed with 86 parts of a p-xylene and was oxidized by bubbling dry air through liquid at the rate of approximately 29 parts per hour to achieve a conversion of alkylaluminum groups to aluminum alkoxides of about 85 percent. The mixture was distilled at approximately 90–110° C. at 1 mm. pressure. The residue was then mixed with 105 parts of p-xylene.

Approximately 45 parts of the xylene solution of the oxidation product was placed in a vessel maintained at a temperature of 70° C. There was then added, with rapid stirring, 2.11 parts of ethanol. After 70 minutes of reaction time, the mixture was distilled at approximately 1 mm. of pressure, the temperature being controlled within the range of 110–140° C. to yield an aluminum alkoxide product. The aluminum alkoxide was then hydrolyzed in dilute acid (the low pH being employed so as to avoid the inconvenience of handling a precipitate of hydrous aluminum oxide) and the resulting mixture of alcohols was found to contain less than 0.2 percent of $C_8$ hydrocarbons.

Example 2

Twenty-seven parts of xylene solution of oxidation product obtained in Example 1 was treated with 1.62 parts of butanol, and the product was distilled under reduced pressure, all conditions being similar to those employed in Example 1. Hydrolysis of the aluminum alkoxide product yielded a mixture of alcohols containing approximately 0.2 percent $C_8$ hydrocarbon.

Example 3

Thirty parts of the xylene solution of oxidation product obtained in Example 1 was reacted with 1.35 parts of methanol at 60° C., with rapid stirring. Within a period of 5 minutes the entire reaction mixture formed a gel which presented difficulties in handling in subsequent distillation. Although reaction in this case was complete, it became apparent that for distillation and subsequent hydrolysis on a commercial scale, more expensive equipment or more specialized techniques may be required. The low cost of methanol may, of course, make the use of this compound economically feasible in spite of the inconvenience of dealing with the problem of gel formation.

Example 4

Fifteen parts of the xylene solution obtained in Example 1 was reacted with 0.07 part of water at 70° C. with rapid stirring. After 25 minutes of total reaction time, the mixture was distilled under reduced pressure. Hydrolysis of the residue yielded a mixture of alcohols containing approximately 0.1 percent of $C_8$ hydrocarbon.

The experiment of Example 4 serves to demonstrate the fact that water may be used to react selectively with the unoxidized alkylaluminum structures, provided the quantity of water is controlled, the reaction time is not unduly prolonged, and good agitation is maintained, particularly during the initial mixing of the reactants. Since various mixtures of water and alcohols are obtained in many industrial processes, for example, as azeotropic distillate fractions, and are available at low cost, the use of these mixtures is especially attractive from an economic standpoint. From other considerations such as the temperature range employed in distillation steps, other proton donor compounds may be more desirable. By way of explanation, glycol or a glycol mono-ether or other alkoxyalkanol may be employed, so that purification of the final alcohol product may be carried out over a narrow range of distillation temperatures and/or pressures. In this manner may be alleviated certain difficulties and expense involved in cyclic heating and cooling and pressuring and depressuring. It may also be desirable, in some instances, to eliminate the hydrocarbon impurities from the alcohol product without removing the regenerated proton donor compound. In this instance, a portion of the purified alcohol product may be used as the proton donor, or a compound may be chosen which will at least have no detrimental effect so far as the intended use of the product is concerned. Among the latter type of compounds are certain substituted phenols which are sold commercially as antioxidants. The strongly acidic phenols are not preferred, however, because of a tendency to react with the alkoxyaluminum structures as well as unoxidized alkylaluminum bonds.

So that the commercial operation of the process may be more fully understood, reference may be had to the drawing. Alkylaluminum growth product is conveyed through conduit 1 to oxidation reactors 2 and 3 in which the alkylaluminum structures are incompletely oxidized with air or other oxygen-containing gas which enters both reactors through manifold 4. A single reactor of sufficient size, or a larger number of reactors may, of course, be employed. The oxidized product mixture is then conveyed through conduit 5 to the distillation equipment. As a diluent, such as an unreactive hydrocarbon solvent, may desirably be employed in the process, it may be more convenient and economical to perform the distillation to recover the solvent in a first distillation apparatus 6 from which the oxidized product mixture is then carried through conduit 7 to low-pressure distillation apparatus 8. The olefins are then removed by distillation and are carried to storage through conduit 9. (In the event that separate olefin recovery becomes uneconomical, the distillation in apparatus 8 may be eliminated.)

The aluminum alkoxide product is then carried through conduit 10 to reactor 11, in which residual alkylaluminum bonds are reacted with a proton donor hydroxy compound introduced through conduit 12. The reaction product is then carried through conduit 13 to distillation apparatus 14, in which hydrocarbons are removed by distillation under reduced pressure and removed by conduit 15. The aluminum alkoxide product is then carried through conduit 16 to reactor 17 in which hydrolysis is carried out by treatment with dilute acid, introduced through conduit 18. The hydrolysis mixture is then conveyed through conduit 19 to separator 20, alcohols being carried through conduit 21 to subsequent drying, fractionation and storage. The aqueous phase which is separated may then be processed to recover alumina and other by-products and also traces of higher alcohols and possibly water for re-use.

While particular embodiments of the invention have been described, it will be understood, of course, that the invention is not limited thereto, since many modifications may be made and it is therefore contemplated to cover by the appended claims any such modifications as fall within the true spirit and scope of the invention.

The invention having thus been described, what is claimed and desired to be secured by Letters Patent is:

1. A process for the conversion of trialkylaluminum to alcohols comprising the steps of incompletely oxidizing trialkylaluminum by contacting said trialkylaluminum with an oxygen-containing gas, thereby obtaining a product mixture containing aluminum alkoxides and compounds with alkylaluminum structure, reacting said product mixture with a quantity of a compound having at least one hydroxyl group which acts as a proton donor and selected from the class of compounds consisting of monohydric and polyhydric alcohols, alkoxyalkanols, phenols and water, the quantity of said proton donor being the amount required to react with substantially all of the alkylaluminum structures in said product mixture, thereby obtaining a second product mixture containing aluminum alkoxides and hydrocarbons, distilling said second product mixture to recover aluminum alkoxides substantially free from hydrocarbons and hydrolyzing said aluminum alkoxides, thereby obtaining alcohols which are substantially free from hydrocarbon contaminants.

2. A process for the conversion of olefin-containing trialkylaluminum to alcohols comprising the steps of incompletely oxidizing a crude mixture of trialkylaluminum compounds and olefins by contacting said crude mixture with an oxygen-containing gas, thereby obtaining a product mixture containing aluminum alkoxides and compounds with alkylaluminum structure, distillation of said product mixture, thereby removing olefin by-products, reacting the resulting olefin-free product mixture with a quantity of a compound having at least one hydroxyl group which acts as a proton donor and selected from the class of compounds consisting of monohydric and polyhydric alcohols, alkoxyalkanols, phenols, and water, the quantity of said proton donor being the amount required to react with substantially all of the alkylaluminum structures in said product mixture, thereby obtaining a second product mixture containing aluminum alkoxides and saturated hydrocarbons, distilling said second product mixture to recover aluminum alkoxides substantially free from hydrocarbons and hydrolyzing said aluminum alkoxides, thereby obtaining alcohols which are substantially free from hydrocarbon contaminants.

3. A process according to claim 1 in which the proton donor compound is a monohydric alcohol.

4. A process according to claim 1 in which the proton donor compound is a polyhydric alcohol.

5. A process according to claim 1 in which the proton donor compound is a phenol.

6. A process according to claim 1 in which the proton donor compound is water.

7. A process according to claim 1 in which the proton donor compound is recycled alcohol product.

8. A process according to claim 2 in which the proton donor compound is a monohydric alcohol.

9. A process according to claim 2 in which the proton donor compound is a polyhydric alcohol.

10. A process according to claim 2 in which the proton donor compound is a phenol.

11. A process according to claim 2 in which the proton donor compound is water.

12. A process according to claim 2 in which the proton donor compound is recycled alcohol product.

References Cited in the file of this patent

UNITED STATES PATENTS

| | | |
|---|---|---|
| 2,863,895 | Kirshenbaum et al. | Dec. 9, 1958 |
| 2,892,858 | Ziegler | June 30, 1959 |